Patented Dec. 28, 1943

2,337,681

UNITED STATES PATENT OFFICE 2,337,681

COPOLYMER

Maxwell Aaron Pollack, Austin, Tex., assignor to Pittsburgh Plate Glass Company, Pittsburgh, Pa., a corporation of Pennsylvania No Drawing. Application February 19, 1942, Serial No. 431,497

6 Claims. (Cl. 260—84)

This invention relates to a novel polymerization product. Prior to the present invention, it has often been observed that numerous unsaturated compounds polymerize to products of relatively low melting or softening point. This has been noted as particularly true of many of the conventionally known thermoplastic polymers such as polymerized methyl methacrylate, vinyl acetate, etc., which soften at undesirably low temperatures. Moreover, it is often observed that many polymerizable compounds polymerize very slowly and, in consequence, polymers having desirable properties can be produced from such materials only with difficulty.

In accordance with the present invention, I have found that many of these difficulties may be avoided and desirable products may be prepared by copolymerizing a saponifiable derivative of alpha haloacrylic acid such as a derivative of an alpha chloroacrylic acid with another polymerizable compound such as a polymerizable olefin, ester, or halide. The term "saponifiable derivative of chloroacrylic acid" and "saponifiable derivative of haloacrylic acid" is intended to include the esters, amides, substituted amides and nitriles of alpha chloroacrylic acids. The invention is particularly directed to the polymers derived from esters of alpha chloroacrylic acid. Various esters such as the methyl, ethyl, propyl, butyl, amyl, n-hexyl, octyl, lauryl, octadecyl, methallyl, vinyl, propargyl, phenyl, cresyl, naphthyl, phenylethyl, cyclohexyl, fenchyl, furfuryl, thienyl, cyclohexenyl, 2-chloroallyl, crotyl, etc., esters or the polyhydroxy esters such as the esters of ethylene, propylene, butylene, amylene, pentamethylene, or tetramethylene glycol or the corresponding di-, tri-, or tetra or other polyglycol or of glycerol, alpha methyl glycerol, sorbitol, etc., may be copolymerized with the desired polymerizable material.

While the product derived from esters of alpha chloroacrylic acid are found to be other haloacrylic derivatives such as the methyl, ethyl, propyl, butyl, lauryl, allyl, propargyl, methallyl, fenchyl, furfuryl, oleyl, glycol, diethylene glycol, glycerol, phenyl, or resorcinol esters or other esters of alpha bromoacrylic acid or of halogen derivatives of other alpha chloroacrylic acids such as alpha chloro beta dichloroacrylic acid, alpha beta dichloroacrylic acid or the corresponding alpha beta dibromoacrylic acid. Thus, compounds such as methyl alpha beta dibromoacrylate, methyl alpha beta dichloroacrylate, or ethyl trichloroacrylate may be used.

The above compounds may be polymerized with various other polymerizable materials. More particularly, it is found that improved products are secured by copolymerizing the above derivatives, particularly the esters, with other polymerizable esters, polymerizable olefins, or halides of such olefins, such as methyl, ethyl, propyl, or butyl acrylate, methacrylate, alpha ethyl acrylate, alpha propyl acrylate, or other alpha alkyl or aryl substituted acrylate or other alpha substituted acrylate, or mono or polybasic acid esters of vinyl, allyl, methallyl, oleyl, crotyl, cinnamyl, or other unsaturated polymerizable alcohol, such as polyallyl, polymethallyl, polyvinyl, polycrotyl, or polypropargyl phthalate, oxalate, citrate, succinate, carbonate, adipate, maleate or malate, or other esters of a polybasic acid or vinyl, allyl, methallyl, or crotyl, or other unsaturated acetate, benzoate, or propionate, or esters of other unsaturated acids such as crotonic, tiglic, maleic, fumaric, citraconic, cinnamic, or propiolic acids, such as methyl, ethyl, vinyl, or allyl crotonate, propiolate, fumarate, etc., or the mono or polyesters of unsaturated acids and polyhydric alcohols such as the acrylic, crotonic, cinnamic, propiolic, methacrylic, etc., polyesters of ethylene, propylene, butylene, glycol, or polyglycol, glycerol, sorbitol, mannitol, phthalyl alcohol, etc., or the halides of unsaturated alcohols such as vinyl, allyl, or methallyl chloride, fluoride, or bromide, or other corresponding olefins or halo-olefins such as butadiene, $\alpha$ or $\beta$-chlorobutadiene, isoprene, or other butadiene derivatives, ethylene, etc.

By copolymerizing the chloroacrylic compounds with other compounds capable of forming thermoplastic polymers, it is found that the product is substantially harder and more resistant to temperature deformation than the polymer derived by polymerization of such other compounds alone. On the other hand, if the alpha chloroacrylic compounds are copolymerized with compounds capable of forming thermosetting materials such as diallyl or divinyl phthalate, oxalate, etc., the copolymers are substantially more tough and flexible than the polymers of such diallyl esters when polymerized alone.

In particular, copolymers of the above materials with methyl and ethyl alpha chloroacrylate are especially valuable. Thus, for example, by copolymerizing a mixture of methylalpha chloroacrylate and methyl methacrylate, a colorless, transparent resin is obtained which has the higher softening point, degree of hardness, uninflammability and wear-resistance characteristics of the methyl alpha chloroacrylate polymer which has much of the flexibility and toughness of the polymeric methyl methacrylate.

Products having many of the characteristics of rubber may be secured by copolymerizing butadiene, isoprene, or chlorobutadiene, or other butadiene with an ester of alpha chloroacrylic acid or the nitrile or amide of such acid. These products may be utilized as such or may be further hardened or toughened by use of vulcanizing agents such as sulphur, sulphur chloride, etc.

Similarly, desirable products may be secured when a plurality of alpha-chloroacrylic compounds are copolymerized in this manner. Especially valuable in this connection is the copolymer obtained from a mixture of a chloroacrylic ester of a monohydric alcohol, such as butyl chloroacrylate, and that of a polyhydric alcohol, such as ethylene glycol dichloroacrylate. I have found that the addition of a small amount of the latter (1 to 10 percent) appears to cause a tremendous decrease in solubility and fusibility of the polymerized material. The properties are valuable where resistance to wear and solvents is important.

It is also found that improved styrene polymers may be secured by copolymerizing a haloacrylic compound such as methyl alpha chloroacrylate, methyl alpha bromoacrylate, etc., with styrene. These products are found to be substantially harder and to possess softening points substantially higher than that of ordinary styrene. Moreover, they possess improved oil resistance.

Alpha chloroacrylic acid esters used in accordance with this invention may be prepared by the methods described in my application Serial No. 181,721, filed December 24, 1937, or my United States Letters Patent No. 2,245,547, granted June 10, 1941. In accordance with the methods therein described, the ester is prepared by esterification of the corresponding acid or by dehydrohalogenation of an ester of alpha beta dichloropropionic acid. Thereafter, the alpha chloroacrylate is distilled under subatmospheric pressure, preferably in the presence of a polymerization inhibitor such as hydroquinone, in order to prevent polymerization.

The polymerization may be conducted in the presence of oxygen, catalysts, such as oxygen, ozone, hydrogen peroxide or benzoyl, lauryl or other peroxide without heat and/or light. The temperature required is dependent upon the character of the copolymerizing compound, but preferably, should not exceed about 125° C.

The proportions of the various polymerizable materials utilized is dependent upon the individual materials selected and upon the character of the product desired. Thus, in copolymerizing methyl esters of chloroacrylic acid and methacrylic acid, a product having a softening point substantially above that of methyl methacrylate polymer is obtained by use of in excess of 10 percent of the chloroacrylic compound. Similar results may be obtained with other resins, and it is further observed that as the proportion of alpha chloroacrylic compound is increased, the wear-resistance, solvent-resistance, hardness, and toughness is materially decreased. Accordingly, the concentration of chloroacrylic compound may vary over a very wide range, for example, from 1 to 95 percent of the copolymer.

The polymers may be formed by polymerization of mixtures of undiluted monomers and in such case they may be cast polymerized. Alternatively, the mixture may be polymerized in a suitable solvent, such as acetone, dioxane, benzene, xylene, toluene, etc., and the solvent removed by evaporation or the polymer recovered by precipitation with a nonsolvent such as water, alcohols such as ethyl or methyl alcohol, glycol, etc. Moreover, an emulsion of the monomers in a nonsolvent such as water may be polymerized, preferably in the presence of a suitable emulsifying agent such as isopropyl naphthalene sodium sulphonate, lauryl or hexyl sulphates, or other suitable agent. In such a case the polymer is formed as a dispersion similar to latex, which may be coagulated by heating, chilling, or addition of nonsolvents.

The following examples are illustrative:

Example I

A mixture consisting of 9 parts by weight of methyl alpha chloroacrylate, 9 parts by weight of methyl methacrylate, and 0.2 part of benzoyl peroxide was slowly heated to 80° C. At this temperature polymerization occurred almost immediately. The reaction was completed by heating at 100-120° C. for two hours. The resulting hard, colorless mass was dissolved in acetone and precipitated from the solution by the addition of methyl alcohol. The polymer was filtered and dried in air. The resulting fine white powder, which was obtained in almost quantitative yields, softened at 140-150° C. and from analysis of the material, it appeared to be a copolymer composed of approximately equal quantities of methacrylate and chloroacrylate units. By allowing the solvent to evaporate from a dioxane solution of this material, a hard, colorless, transparent film was obtained.

Example II

Equal parts of styrene and methyl alpha chloroacrylate were polymerized in a manner similar to the procedure described in Example I, and a product which softened at 104-114° C. was obtained in quantitative amounts. A hard, colorless, transparent film was obtained by evaporating a dioxane solution of this material.

Example III

A mixture of 11 parts of vinyl acetate, 11 parts of methyl alpha chloroacrylate, and 0.2 part of benzoyl peroxide was heated to 80° C. The polymerization occurred slowly, and after refluxing for 4 hours, a substantial amount of polymerized produce, as well as some unpolymerized vinyl acetate, was obtained. The mixture was dissolved in dioxane and the polymer was precipitated by the addition of aqueous methyl alcohol. This product softened at 123-131° C. and also gave a hard, colorless, transparent film upon evaporation of a dioxane solution thereof.

Example IV

A mixture of 30 parts of butadiene, 15 parts of methyl alpha chloroacrylate, 0.8 part of acetic acid, 2 parts of sodium alkyl sulfate and 210 parts of water was shaken in a stainless steel autoclave at 60° C. for 5 days. The resulting latex was coagulated by adding dilute aqueous sodium hydroxide, and warming the mixture. The coagulum was obtained in good yield and was washed and dried on rubber roller mills.

Example V

Example IV was repeated with alpha chloroacrylonitrile instead of methyl alpha chloroacrylate. The tough, rubber-like product was also obtained in good yield.

*Example VI*

The copolymerization of butadiene and ethyl alpha chloroacrylate was also carried out by the process described in Example IV, using 45 parts of butadiene and 30 parts of ethyl alpha chloroacrylate (B. P. 35–40/15 mm.) in 400 parts of water in the presence of 1.5 parts of acetic acid and 4 parts of sodium cetyl sulfate. The product was tough, rubber-like, and was readily vulcanized to a resilient material.

*Example VII*

By stirring a mixture of 180 parts of 2-chlorobutadiene-1,3 and 45 parts methyl alpha chloroacrylate into 250 parts of a paste of 130 parts of sodium cetyl sulphate and 300 parts of water, there was obtained an emulsion which rapidly polymerized. After 3 hours one part of phenyl beta naphthylamine was added in benzene solution and the whole was stirred well before coagulating with brine. The rubbery coagulum was washed and dried, giving a tough, rubber-like product.

*Example VIII*

50 parts of butadiene-1,3, 50 parts of methyl alpha chloroacrylate, and 0.4 part of benzoyl peroxide were heated in a closed vessel for 4 days at 60° C. 56 parts of a fairly soft rubber-like mass was thus obtained. The interpolymer contained 60 percent of methyl alpha chloroacrylate.

The polymers thus prepared may be used advantageously as coating and impregnating agents, adhesives, rubber substitutes, in the preparation of safety glass as a layer, etc.

Although the present invention has been described with reference to specific details of certain embodiments thereof, it is not intended that such details shall be regarded limitations upon the scope of the invention, except insofar as included in the accompanying claims. This application is a continuation-in-part of my copending applications Serial Nos. 181,721, filed December 24, 1937, and 366,725, filed November 22, 1940.

I claim:
1. A copolymer of styrene and a saponifiable derivative of an alpha haloacrylic acid.
2. A copolymer of styrene and a saponifiable derivative of an alpha chloroacrylic acid.
3. A copolymer of styrene and an ester of an alpha haloacrylic acid.
4. A copolymer of styrene and an alkyl ester of alpha chloroacrylic acid.
5. A copolymer of styrene and methyl alpha chloroacrylate.
6. A completely homogeneous, heat and light stable product resulting from copolymerization of an approximately equimolar mixture of monomeric methyl alpha-chloroacrylate and monomeric styrene.

MAXWELL AARON POLLACK.